Figure 1:
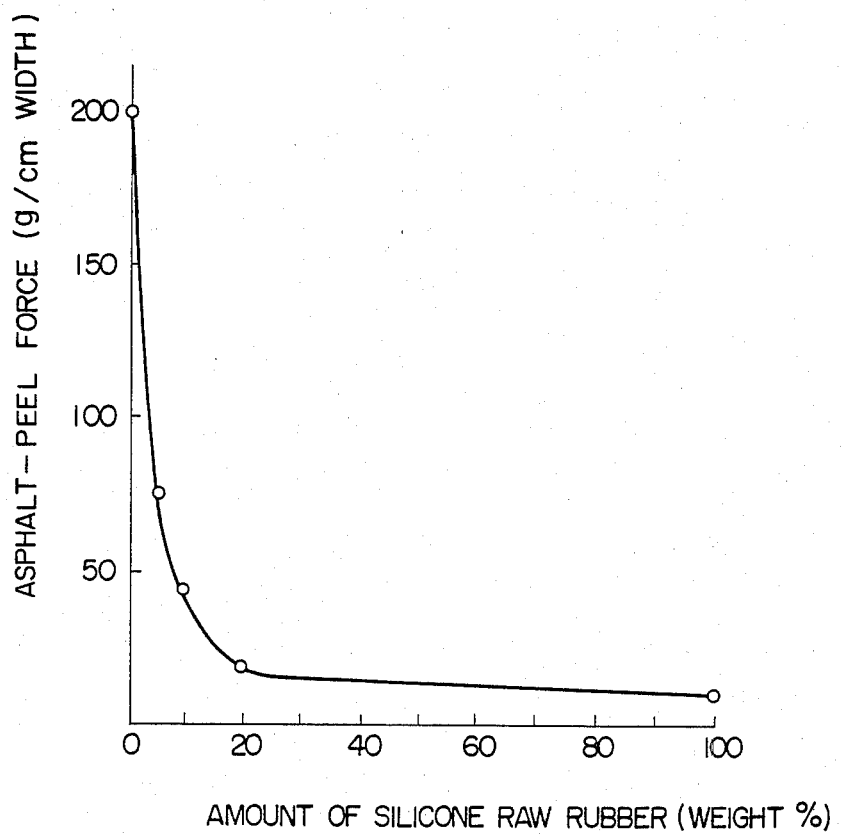

United States Patent [19]

Wada

[11] Patent Number: 4,517,332

[45] Date of Patent: May 14, 1985

[54] RUBBER COMPOSITION CONTAINING A SILICONE RAW RUBBER

[75] Inventor: Noriaki Wada, Kobe, Japan

[73] Assignees: Japan Synthetic Rubber Co., Ltd., Tokyo; Bando Chemical Industries, Ltd., Kobe, both of Japan

[21] Appl. No.: 494,051

[22] Filed: May 12, 1983

[30] Foreign Application Priority Data

May 16, 1982 [JP] Japan .................. 57-82795

[51] Int. Cl.$^3$ .................. C08L 7/00; C08L 9/00; C08L 9/02; C08L 83/06

[52] U.S. Cl. .................. 524/506; 198/500; 198/844; 198/846; 525/104; 525/105

[58] Field of Search .............. 525/105, 104; 198/500, 198/844, 846; 524/506

[56] References Cited

U.S. PATENT DOCUMENTS

| | | | |
|---|---|---|---|
| 2,470,772 | 5/1949 | Hass | 525/105 |
| 3,969,308 | 7/1976 | Penneck | 525/105 |
| 4,172,811 | 10/1979 | Sanford et al. | 198/500 |
| 4,197,937 | 4/1980 | Sanford et al. | 198/500 |
| 4,201,698 | 5/1980 | Itoh et al. | 525/105 |
| 4,234,702 | 11/1980 | Nakamura | 525/105 |
| 4,242,287 | 12/1980 | Allen | 525/105 |
| 4,341,675 | 7/1982 | Nakamura | 524/506 |
| 4,376,184 | 3/1983 | Itoh et al. | 525/105 |

FOREIGN PATENT DOCUMENTS

| | | | |
|---|---|---|---|
| 2837117 | 3/1979 | Fed. Rep. of Germany | 525/105 |
| 2307733 | 12/1976 | France | 198/500 |
| 55-71737 | 5/1980 | Japan | 525/105 |
| 628059 | 8/1949 | United Kingdom | 525/105 |

*Primary Examiner*—Allan M. Lieberman
*Attorney, Agent, or Firm*—Oblon, Fisher, Spivak, McClelland & Maier

[57] ABSTRACT

A rubber composition capable of giving a non-tacky vulcanized rubber can be obtained by mixing 98 to 80% by weight of at least one organic rubber selected from natural rubber and organic synthetic rubbers and 2 to 20% by weight of a silicone raw rubber having a molecular weight of 100,000 to 1,000,000. A conveyor belt in which at least the surface layer is composed of a vulcanizate of this rubber composition is suitable for carrying highly tacky substances such as oil sand.

11 Claims, 2 Drawing Figures

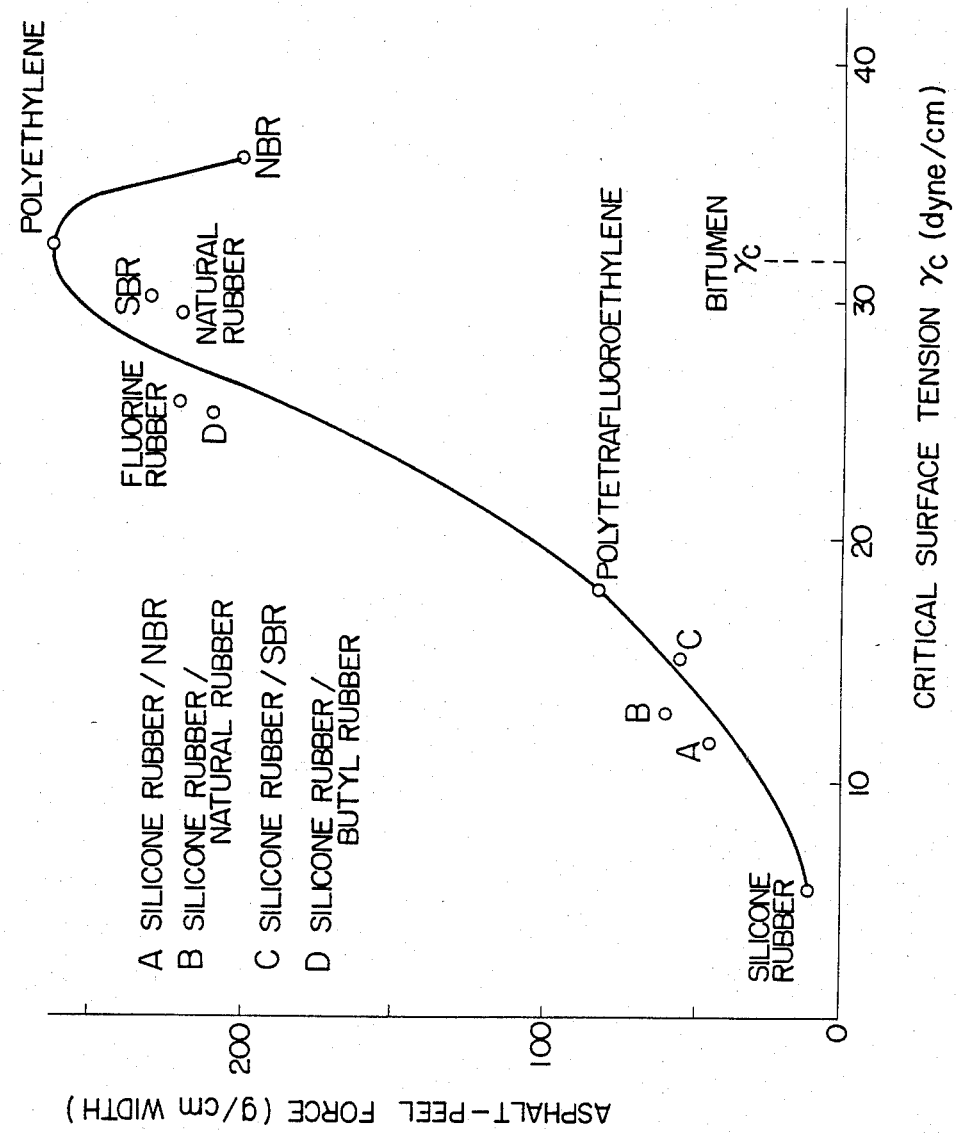

RUBBER COMPOSITION CONTAINING A SILICONE RAW RUBBER

This invention relates to a rubber composition, and particularly to a rubber composition capable of giving a non-tacky vulcanized rubber as well as to a conveyor belt in which at least the surface layer is composed of a vulcanizate of such a rubber composition and accordingly is suitably usable particularly for carrying highly tacky substances such as oil sand. The present invention further relates to a method for carrying tacky substances such as oil sand by the use of a belt having a surface layer of a vulcanizate of the rubber composition mentioned above.

Oil sand is a petroleum resource buried in the ground in a large quantity particularly in Canada and Venezuela. The Athabasca oil sand in Canada is especially well-known because it makes up about one third of the total world oil sand reserve. Taking this oil sand as an example, this has the structure that each fine siliceous sand grain is coated with a thin water film which is further surrounded with bitumen. The water film contains very small quantities of metals. Since this oil sand contains generally 5 to 20% by weight of a heavy and highly viscous bitumen, it is being collected commercially as a petroleum resource. As methods for collecting oil sand, there are a so-called open pit mining and a method wherein bitumen is separated underground from unnecessary components such as siliceous sand and the like and then collected. In Athabasca, there is being used an open pit mining, in which overburdens are removed and then the oil sand is directly collected. The oil sand collected is thereafter carried to an extractive refining plant by means of belts.

As belts for carrying oil sands, there have heretofore been used rubber belts in which (a) a rubber mixture of natural rubber and styrene-butadiene rubber or (b) acrylonitrile-butadiene rubber is reinforced with a steel cord. However, oil sand adheres to and deposits on these belts, thereby contaminating the belts and reducing the volume of the oil sand transferred. Accordingly, in carrying oil sand to an extractive refining plant, relatively less expensive petroleum fractions such as kerosene, gas oil and the like have been scattered on the belts to prevent adhesion of the oil sand to the belts. But, this method has a fire hazard, accelerates deterioration of the conveyor belt and increases the collection cost. Further, conveyor belts used in Athabasca are required to have excellent characteristics at low temperatures, particularly excellent flexibility at low temperatures, because the atmospheric temperature in winter goes down to around minus 50° C. in Athabasca.

The present invention has been made in order to solve the above mentioned problems. An object of this invention is to provide a rubber composition capable of giving a non-tacky vulcanized rubber as well as a surface non-tacky conveyor belt having a surface layer made of a vulcanizate of this rubber composition. A further object of this invention is to provide a method for carrying oil sand, which is viscous, by a conveyor belt as mentioned above substantially without allowing the oil sand to adhere to the surface of the belt.

According to this invention, there is provided a rubber composition consisting essentially of a rubber mixture of 98 to 80% by weight of at least one organic rubber selected from the group consisting of natural rubber and organic synthetic rubbers and 2 to 20% by weight of a silicone raw rubber having a molecular weight of 100,000 to 1,000,000.

The organic synthetic rubbers used in this invention have preferably polarities different from that of the silicone raw rubber, and include, for example, isoprene rubber, styrene-butadiene rubber, acrylonitrile-butadiene rubber, butadiene rubber, chloroprene rubber, and the like. These rubbers may be used alone or in admixture of two or more. Particularly, as the organic rubber, at least one rubber selected from the group consisting of natural rubber, isoprene rubber, styrene-butadiene rubber and acrylonitrile-butadiene rubber is preferable, and if necessary, to these may be added butadiene rubber, chloroprene rubber, etc.

The silicone raw rubber used in this invention is substantially an organopolysiloxane represented by the general formula —$R_2SiO$— in which R is an alkyl group such as methyl, ethyl, propyl, butyl, pentyl, hexyl, heptyl, nonyl, decyl, dodecyl, stearyl, palmityl, cyclohexyl, or the like; an alkenyl group such as vinyl, allyl, or the like; an aryl group such as phenyl, naphthyl, or the like; an aralkyl group such as benzyl, β-phenylethyl, 2-phenylethyl, 2-phenylpropyl or the like; a haloalkyl group such as 3-chloropropyl, 3,3,3-trifluoropropyl, or the like; a cyanoalkyl group such as 3-cyanopropyl, or the like. Among them, alkyl groups and aryl groups are preferable, and methyl and phenyl are particularly preferable. The organopolysiloxane generally contains about 0.1 to 1 mole % of vinyl group as part of R in the above general formula. However, the silicone raw rubber used in this invention need not contain vinyl group. In this invention, dimethyl silicone raw rubber is particularly preferable. However, if necessary, methyl vinyl silicone raw rubber and methyl phenyl silicone raw rubber may also be used alone or in combination with dimethyl silicone raw rubber. These silicone raw rubbers are required to have a molecular weight of 100,000 to 1,000,000. If they have a molecular weight smaller than 100,000, when they are added to the above-mentioned organic rubbers, the resulting rubber mixture does not give a non-tacky vulcanizate.

The rubber mixture used in this invention is composed of 98 to 80% by weight of the above-mentioned organic rubber and 2 to 20% by weight of the above-mentioned silicone raw rubber, and preferably composed of 95 to 85% by weight of the organic rubber and 5 to 15% by weight of the silicone raw rubber. When the quantity of the silicone raw rubber added is less than 2% by weight, a vulcanizate of the rubber composition of this invention does not have a sufficient non-tackiness against tacky substances such as oil sand. On the other hand, when the quantity of the silicone raw rubber added is more than 20% by weight, said rubber composition is difficult to process and the resulting vulcanizate has an inferior strength.

The rubber composition of this invention contains an appropriate vulcanizing agent depending upon the organic rubber used. When there are used, as the organic rubbers, natural rubber, isoprene rubber, styrene-butadiene rubber, acrylonitrile-butadiene rubber, and butadiene rubber, usually sulfur and/or sulfur-containing compounds may be used as vulcanizing agents. The sulfur-containing compounds may be any such compounds as long as they can vulcanize the above-mentioned organic rubbers, and there may preferably be used, for example, tetramethylthiuram disulfide, tetraethylthiuram disulfide, and the like. These vulcanizing agents are added in a proportion of 0.1 to 10 parts by weight, preferably of 1 to 5 parts by weight per 100 parts by weight of the above-mentioned rubber mixture. Also, a vulcanizing adjuvant may be used in combination with vulcanizing agents. As the vulcanizing adjuvants, there may be used any vulcanizing adjuvant which have been known for the above-mentioned organic rubbers, in a proportion of 0.1 to 8 parts, preferably 0.1 to 3 parts, by weight per 100 parts by weight of the rubber mixture. There may be used a vulcanization accelerator, for example, diphenylguanidine, a di-o-tolylguanidine salt of dicatecholboric acid, 2-mercaptobenzothiazol, dibenzothiazyl disulfide, N-cyclohexyl-2-benzothiazyl sulfenamide, tetramethylthiuram monosulfide, or the like and an activator, for example, a metal oxide such as zinc white, magnesium oxide, litharge or the like; a fatty acid such as stearic acid, oleic acid or the like; amines such as triethanol amine, diethanol amine or the like; or another activator such as diethylene glycol, triallyl trimellitate or the like. When chloroprene rubber is used as the organic rubber, zinc oxide, magnesium oxide or the like may be used as the vulcanizing agent, in a proportion of 0.1 to 10 parts by weight per 100 parts by weight of the rubber mixture, and if necessary, an appropriate vulcanization accelerator may be used with the vulcanizing agent.

Further, to the rubber composition of this invention may be added an organic peroxide, platinum or a platinum compound, a metal salt of an organic acid, and so forth which are usually used in the vulcanization of silicone raw rubbers. As the organic peroxides, there may be used, for example, benzoyl peroxide, 2,5-dimethyl-2,5-di(t-butylperoxy)hexane, dicumyl peroxide, 1,1-bis(t-butylperoxy)-3,3,5-trimethylcyclohexane, di-t-butyl peroxide, 1,3-bis(t-butylperoxyisopropyl)benzene and the like. The organic peroxide is added usually in a proportion of 0.1 to 10 parts by weight per 100 parts by weight of the silicone raw rubber.

Further, the rubber composition of this invention may contain, in addition to the above-mentioned components, various fillers which are conventionally used in the above mentioned organic rubbers in a conventional proportion. As the fillers, there may be used, for example, carbon black, silica, calcium carbonate, clay, magnesium carbonate, diatomaceous earth, various silicates and organic fillers. When these fillers are added, plasticizers may be used along therewith such as di(2-ethylhexyl) phthalate, di(2-ethylhexyl) adipate, dibutyl phthalate, tri(2-ethylhexyl) trimellitate, tricresyl phosphate and the like as well as softeners such as paraffinic process oils, aromatic process oils and the like. Further, there may be used together therewith age resistors such as phenyl-α-naphthylamine, N,N-diphenyl-p-phenylenediamine, 6-ethoxy-2,2,4-trimethyl-1,2-dihydroquinone, N-phenyl-N'-isopropyl-p-phenylenediamine, 2-mercaptobenzoimidazole, nickel dibutyldithiocarbamate and the like. If necessary, there may further be used scorch retarders, processing aids, and the like.

The rubber composition of this invention can usually be produced by kneading the above-mentioned components by a Banbury mixer, a kneader, a roll or the like. The rubber composition can also be produced by an alternative method in which a filler such as a fine silica powder or the like is previously impregnated with the silicone raw rubber, the thus impregnated filler is mixed with other components, and the resulting mixture is applied to the same kneading.

The rubber composition of this invention is usually vulcanized by pressing it for 10 to 60 min at 130° to 170° C. to obtain a vulcanizate.

The vulcanized rubber thus obtained is markedly excellent in non-tackiness against bitumen and accordingly can be suitably used in the surface layer of conveyor belts for carrying oil sand containing bitumen.

Accordingly, in accordance with the present invention, there is further provided a conveyor belt in which at least the surface layer is composed of vulcanizate of a rubber composition consisting essentially of (1) 100 parts by weight of a rubber mixture of 98 to 80% by weight of at least one organic rubber selected from the group consisting of natural rubber and organic synthetic rubbers and 2 to 20% by weight of a silicone raw rubber having a molecular weight of 100,000 to 1,000,000, (2) 0.1 to 10 parts by weight of a vulcanizing agent, and (3) 10 to 200 parts by weight of a filler.

As the organic rubber for use in conveyor belts, preferred are at least one rubber selected from the group consisting of natural rubber, isoprene rubber, styrene-butadiene rubber and acrylonitrile-butadiene rubber. As the filler, carbon black is particularly preferred among the above-mentioned substances. Conveyor belts in which at least the surface layer is composed of a vulcanizate of a rubber compound containing the above components and which are reinforced lengthwise with a metal, an organic fiber cord, a canvas or the like, not only have excellent non-tackiness against oil sand but also are superior in oil resistance, flexibility and low temperature characteristics. Accordingly, these conveyor belts are suitably used for carrying oil sand. The particularly suitable quantity of carbon black added in the case of conveyor belts for carrying oil sand is 20 to 150 parts by weight, preferably 30 to 100 parts by weight, per 100 parts by weight of the above-mentioned rubber mixture.

Accordingly, in the preferable conveyor belt for carrying oil sand according to this invention at least the surface layer is composed of a vulcanizate of a rubber composition consisting essentially of (1) 100 parts by weight of a rubber mixture of 98 to 80% by weight of at least one organic rubber selected from the group consisting of natural rubber, isoprene rubber, styrene-butadiene rubber and acrylonitrile-butadiene rubber and 2 to 20% by weight of a silicone raw rubber having a molecular weight of 100,000 to 1,000,000, (2) 1 to 5 parts by weight of sulfur and/or a sulfur-containing organic compound as a vulcanizing agent and (3) 20 to 150 parts by weight of carbon black as a filler.

As the organic rubber in the above rubber composition, an acrylonitrile-butadiene rubber containing 15 to 25% by weight of acrylonitrile is preferably used because of its excellent balance of cold resistance and oil resistance.

The above rubber composition may, of course, contain a rubber such as butadiene rubber and chloroprene rubber, a vulcanizing agent and a vulcanization accelerator therefor and a filler.

Methods for producing conveyor belts are well known. Conveyor belts in which at least the surface layer is composed of a vulcanizate of the rubber composition mentioned above and which are reinforced lengthwise with an reinforcing cord such as steel cord or organic fiber cord are substantially non-tacky against oil sand which is viscous.

The vulcanizate of this invention peculiarly shows excellent non-tackiness against bitumen with a small quantity of a silicone raw rubber being added to the rubber, because the organic rubber and the silicone raw rubber used in the vulcanizate have different polarities. The reason therefor is presumed to be that the silicone raw rubber has a polarity different from those of organic rubbers and accordingly is localized and arranged on the surface of the vulcanized rubber. However, this invention is not restricted by any theory. Incidentally, the critical surface tension (hereinunder, referred to as γc) of the vulcanizate of this invention is extremely small and close to that of a vulcanized silicone rubber. On the other hand, in the case of butyl rubber, ethylene-porpylene rubber and the like whose polarities are similar to that of a silicone rubber, when these rubbers are mixed with a silicone raw rubber and then vulcanized, the γc values of the vulcanizates are merely arithmetic averages of these components and the vulcanizates possess substantially no non-tackiness against bitumen.

The term "γc" used herein is a concept advocated by Zisman and refers to a physical constant obtained by extrapolating cosines of contact angles (θ) of various liquids with a particular high polymer solid because these cos θ values are in a nearly linear relationship with surface tensions of the liquids. In short, γc implies an adhesive power between the high polymer solid and the liquid and is approximately proportional to the cohesive energy of the high polymer solid.

Accordingly, the present invention also provides a method for carrying collected oil sand to an intended extractive refining plant. This method comprises carrying oil sand by means of a conveyor belt in which at least the surface layer is composed of a vulcanizate of a rubber composition consisting essentially of (1) 100 parts by weight of a rubber mixture composed of 98 to 80% by weight of at least one organic rubber selected from natural rubber and the above-mentioned organic synthetic rubbers, preferably from natural rubber, isoprene rubber, styrene-butadiene rubber and acrylonitrile-butadiene rubber, and 2 to 20% by weight of a silicone raw rubber having a molecular weight of 100,000 to 1,000,000, (2) 1 to 50 parts by weight of sulfur, and/or a sulfur-containing organic compound and, if necessary, a metal oxide such as zinc oxide or the like, as a vulcanizing agent and (3) 20 to 150 parts by weight of carbon black as a filler.

Accordingly, in accordance with this method, oil sand can be carried from the collection point to an extractive refining plant without scattering kerosene or the like on the conveyor belt surface as done conventionally and substantially without the oil sand adhering to the surface of the belt. Since the conveyor belt of this invention is also excellent in oil resistance, there is no objection to scattering kerosene or the like on the belt surface.

Hereinunder, this invention will be explained specifically by referring to Examples and Comparative Examples and the accompanying drawings. In the drawings, FIG. 1 is a graph showing a relation between the quantity of a silicone raw rubber added and asphalt-peel force in respect of the vulcanizate of this invention, and FIG. 2 is a graph showing a relation between γc and asphalt-peel force in respect of the vulcanizate of this invention. This invention is not restricted to the Examples. In the Examples and Comparative Examples, parts are by weight unless otherwise specified.

EXAMPLES 1 TO 6 AND COMPARATIVES 1 TO 7

The rubbers shown in Table 1 and a dimethyl silicone raw rubber having a molecular weight of about 500,000 were mixed in the proportions shown in Table 1 and then uniformly kneaded by the use of a twin roll. To each of these rubber compounds were added 60 parts of carbon black, 5 parts of zinc oxide, 2 parts of sulfur, a vulcanization accelerator as shown in Table 1, 3 parts of a processing aid (aromatic process oil), 3 parts of an age resistor, (mixture (1:1) of N-isopropyl-N'-phenyl-p-phenylene diamine and polymer of 2,2,4-trimethyl-1,2-dihydroquinoline) 1 part of stearic acid and a peroxide as shown in Table 1. Each mixture was kneaded uniformly at 80° to 100° C. by a twin roll and then calendered by a roll to obtain a sheet of 2 mm in thickness.

Each of the sheets thus obtained was tested for γc and asphalt-peel force. The results obtained are shown in Table 1. For comparison, sheets were prepared in the same manner as above, except that the silicone raw rubber was omitted, or a silicone oil was substituted for the silicone raw rubber, and they were also tested for γc and asphalt-peel force. Also, a sheet was prepared by adding the silicone raw rubber to butyl rubber and vulcanizing the resulting mixture, and then tested for γc and asphalt-peel force. The results obtained are also shown in Table 1.

Further, FIG. 1 shows a relation between the quantity of the silicone raw rubber added and the asphalt-peel force of a vulcanizate in the case where acrylonitrile-butadiene rubber is used as the organic rubber. From this figure, it is recognized that addition of a small quantity of the silicone raw rubber results in a sharp reduction of asphalt-peel force of the vulcanizate. FIG. 2 shows a relation between γc and asphalt-peel force, with respect to (1) rubbers obtained by adding 10% by weight of a silicone raw rubber to each of the natural rubber, acrylonitrile-butadiene rubber and styrene-butadiene rubber and vulcanizing the resulting mixtures, (2) corresponding vulcanized rubbers free from the silicone raw rubber and (3) other rubbers for comparison.

As is obvious from the above results, according to this invention, vulcanized rubbers having γc values and asphalt-peel forces close to those of silicone rubber can be obtained by adding a small quantity of a silicone raw rubber to organic rubbers and vulcanizing the resulting mixtures. In contrast to these rubbers, all sheets free from the silicone raw rubber have a large γc value and an asphalt-peel force of 200 g/cm width or more. Sheets each containing a different silicone oil have only slightly smaller asphalt-peel forces than the sheets free from the silicone raw rubber. In the case of butyl rubber, even when 30% by weight of the silicone raw rubber is added to 70% by weight of the butyl rubber, the resulting sheet has a γc value and an asphalt-peel force remarkably larger than those of the vulcanized rubbers of this invention.

The γc was measured in accordance with the following method: As liquids of known surface tensions there were used glycerine, formamide, thiodiglycol, ethylene glycol and polyethylene glycol (average molecular weight: 200). Their contact angles (θ) on a vulcanized rubber were measured at 25° C. By extrapolating cosines of these angles to 1, the γc of the vulcanized rubber was obtained. The asphalt-peel force was measured in accordance with the following method: A woodfree paper of 0.08 mm in thickness was pressure-impregnated with an asphalt of a penetration of 200 at a proportion of 0.01 g/cm². To the resulting paper was bonded the above-mentioned sheet having a size of a 1-cm width and a 10-cm length, for 10 sec at 25° C. under a pressure of 3 kg/cm². Then, a 180° peel force was measured at a peel speed of 50 mm/min.

TABLE 1

|  | Example No. |  |  |  |  |  |  |  |  | Comparative Example No. |  |  |  |  |  |  |
|---|---|---|---|---|---|---|---|---|---|---|---|---|---|---|---|---|
|  | 1 | 2 | 3 | 4 | 5 | 6 | 7 | 8 | 9 | 1 | 2 | 3 | 4 | 5 | 6 | 7 |
| Natural rubber[a] | 95 |  | 90 |  |  | 45 | 80 |  | 50 | 90 | 90 | 100 |  |  | 50 |  |
| SBR[b] |  |  |  | 90 |  |  |  |  |  |  |  |  | 100 |  |  |  |
| NBR[c] |  | 95 |  |  | 90 | 45 |  | 80 |  |  |  |  |  | 100 | 50 |  |
| Butyl rubber[d] |  |  |  |  |  |  |  |  |  |  |  |  |  |  |  | 70 |
| Silicone raw rubber[e] | 5 | 5 | 10 | 10 | 10 | 10 | 20 | 20 | 50 |  |  |  |  |  |  | 30 |
| Silicone oil[f] |  |  |  |  |  |  |  |  |  | 10 | 10 |  |  |  |  |  |
| HAF black (N330) | 60 | 60 | 60 | 60 | 60 | 60 | 60 | 60 | 60 | 60 | 60 | 60 | 60 | 60 | 60 | 60 |
| Zinc oxide | 5 | 5 | 5 | 5 | 5 | 5 | 5 | 5 | 5 | 5 | 5 | 5 | 5 | 5 | 5 | 5 |
| Sterar ic acid | 1 | 1 | 1 | 1 | 1 | 1 | 1 | 1 | 1 | 1 | 1 | 1 | 1 | 1 | 1 | 1 |
| Sulfur | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Vulcanization accelerator* | 0.6 | 1.2 | 0.6 | 1.2 | 1.2 | 0.9 | 0.5 | 1.0 | 0.5 | 0.6 | 0.6 | 0.6 | 1.2 | 1.2 | 0.9 | 0.7 |
| Percumyl D-40** | 0.05 | 0.05 | 0.1 | 0.1 | 0.1 | 0.1 | 0.2 | 0.2 | 0.5 | 0.1 | 0.1 | — | — | — | — | 0.3 |
| Peel force (g/cm width) | 80 | 75 | 60 | 55 | 35 | 50 | 15 | 20 | 15 | 200 | 180 | 220 | 230 | 180 | 220 | 210 |
| γc (dyne/cm) | 18 | 17 | 13 | 15 | 12 | 12 | 7 | 8 | 6 | 22 | 20 | 29 | 30 | 36 | 32 | 25 |

[a]SMR-L
[b]Styrene-butadiene rubber, SBR-1500 (cold non-oil-extended SBR, styrene ratio 23.5%).
[c]Acrylonitrile-butadiene rubber, N250S manufactured by Japan Synthetic Rubber Co., Ltd., containing 18% by weight of acrylonitrile.
[d]Butyl 268 manufactured by Japan Synthetic Rubber Co., Ltd. (isobutyrene-isoprene rubber having a degree of unsaturation of 1.5%)
[e]SH 410 manufactured by Toray Silicone Co., Ltd. (dimethyl polysiloxane polymer containing vinyl groups free from fillers)
[f]The molecular weights of silicone oils used in Comparative Examples 1 and 2 are 5,000 and 50,000, respectively.
*In Examples 1 to 9 and Comparative Examples 1 to 7, N—cyclohexyl-2-benzothiazyl sulfenamide was used and in Comparative Example 7 tetramethylthiuram disulfide was used.
**A trade name of Japan Fat and Oil for dicumyl peroxide of a grade of 40%.

What is claimed is:

1. A rubber composition consisting essentially of:
   (1) 100 parts by weight of a rubber mixture of 98 to 80% by weight of at least one organic diene rubber selected from the group consisting of natural rubber and organic synthetic rubbers and 2 to 20% by weight of a silicone raw rubber having a molecular weight of 100,000 to 1,000,000 formed from an organopolysiloxane represented by the general formula —R$_2$SiO—, wherein R is alkyl, alkenyl, aryl, aralkyl, haloalkyl or cyanoalkyl;
   (2) 0.1 to 10 parts by weight of a vulcanizing agent; and
   (3) 10 to 200 parts by weight of a filler.

2. A rubber composition according to claim 1, wherein the organic diene rubber is selected from the group consisting of natural rubber, isoprene rubber, styrene-butadiene butadiene rubber, acrylonitrile-butadiene rubber, butadiene rubber and chloroprene rubber.

3. A rubber composition according to claim 1, wherein the organic diene rubber is selected from the group consisting of natural rubber, isoprene rubber, styrene-butadiene rubber and acrylonitrile-butadiene rubber.

4. A rubber composition according to claim 1, wherein the organic diene rubber is an acrylonitrile-butadiene rubber containing 15 to 25% by weight of acrylonitrile.

5. A rubber composition according to claim 1, wherein R is methyl, ethyl, propyl, butyl, pentyl, hexyl, heptyl, nonyl, decyl, stearyl, palmityl, cyclohexyl, vinyl, allyl, phenyl, naphthyl, benzyl, β-phenylethyl, 2-phenylethyl, 2-phenylpropyl, 3-chloropropyl, 3,3,3-trifluoropropyl or 3-cyanopropyl.

6. A rubber composition according to claim 1, wherein R is an alkyl or aryl group.

7. A rubber composition according to claim 1, wherein R is methyl or phenyl.

8. A rubber composition according to claim 1, wherein the silicone raw rubber is dimethyl silicone raw rubber.

9. A rubber composition according to claim 1, wherein the organic synthetic rubbers have polarities different from that of the silicone raw rubber.

10. A rubber composition according to claim 1, wherein the rubber mixture is composed of 95 to 85% by weight of the said at least one organic diene rubber and 5 to 15% by weight of the said silicone raw rubber.

11. A rubber composition according to claim 1 which further comprises a vulcanizing adjuvant, and a vulcanization accelerator.

* * * * *